Feb. 6, 1962 N. DOUGLAS 3,019,696
SPACE-TIME REPRODUCTION OF SPATIALLY RECORDED IMAGES
Filed Oct. 15, 1956 12 Sheets-Sheet 1

*INVENTOR.*
Newhall Douglas
*BY*
ATTORNEY

Feb. 6, 1962 N. DOUGLAS 3,019,696
SPACE-TIME REPRODUCTION OF SPATIALLY RECORDED IMAGES
Filed Oct. 15, 1956 12 Sheets-Sheet 2
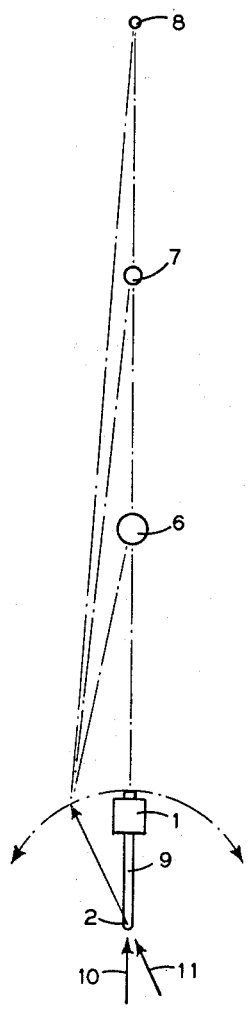
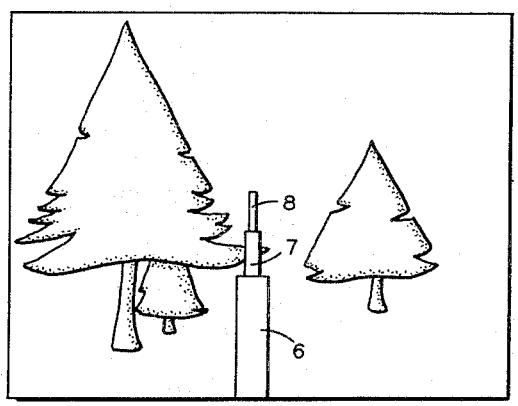
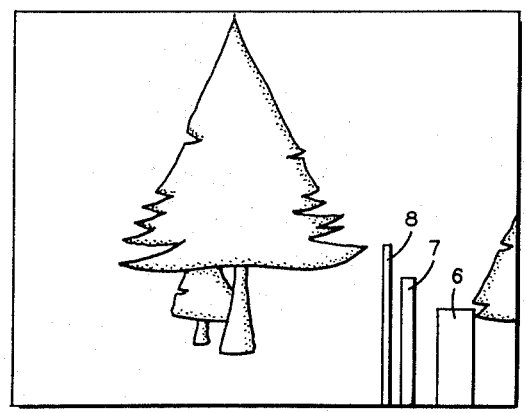
INVENTOR.
Newhall Douglas
BY
ATTORNEY Feb. 6, 1962 N. DOUGLAS 3,019,696
SPACE-TIME REPRODUCTION OF SPATIALLY RECORDED IMAGES
Filed Oct. 15, 1956 12 Sheets-Sheet 3
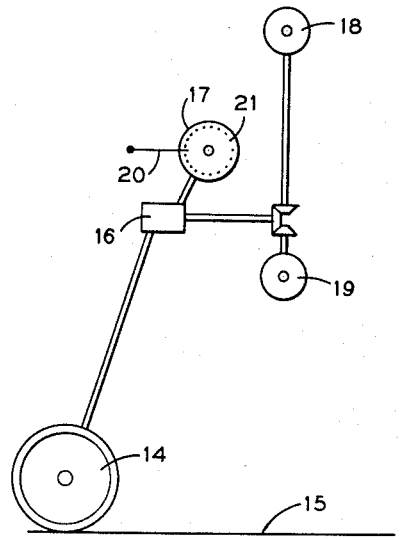
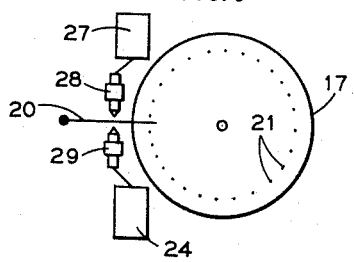
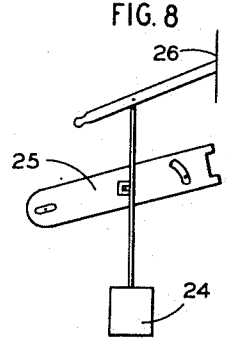
INVENTOR.
Newhall Douglas
BY
ATTORNEY Feb. 6, 1962 N. DOUGLAS 3,019,696
SPACE-TIME REPRODUCTION OF SPATIALLY RECORDED IMAGES
Filed Oct. 15, 1956 12 Sheets-Sheet 4
FIG.10
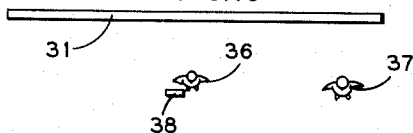
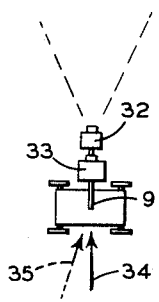
FIG.11
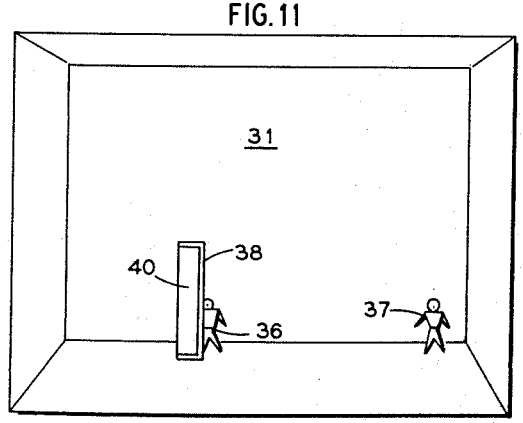
INVENTOR.
Newhall Douglas
BY
ATTORNEY Feb. 6, 1962  N. DOUGLAS  3,019,696
SPACE-TIME REPRODUCTION OF SPATIALLY RECORDED IMAGES
Filed Oct. 15, 1956  12 Sheets-Sheet 5
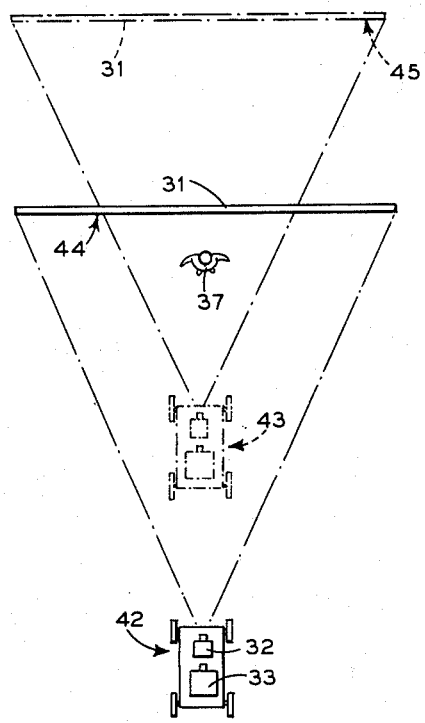
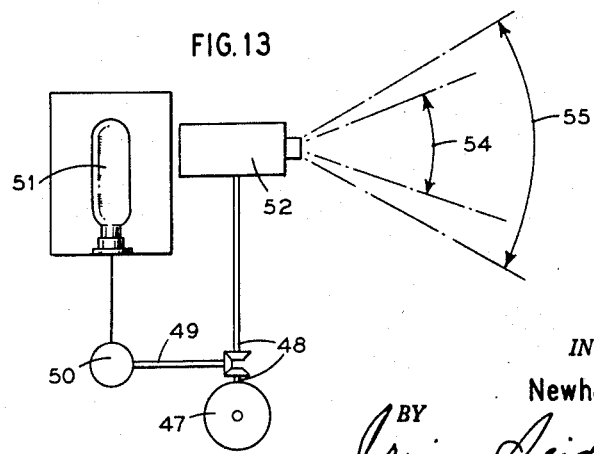
INVENTOR.
Newhall Douglas
BY
ATTORNEY Feb. 6, 1962 N. DOUGLAS 3,019,696
SPACE-TIME REPRODUCTION OF SPATIALLY RECORDED IMAGES
Filed Oct. 15, 1956 12 Sheets-Sheet 6
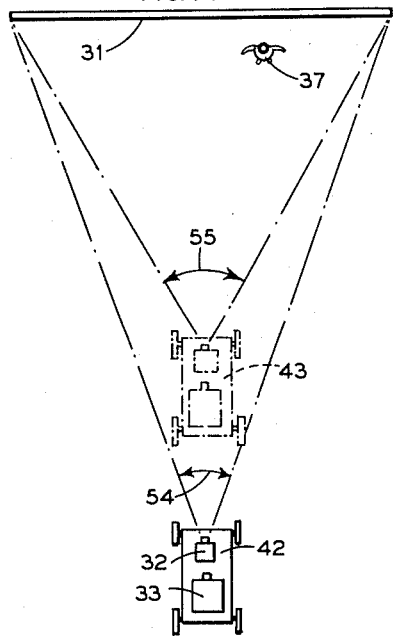
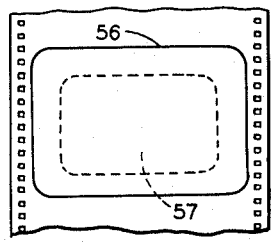
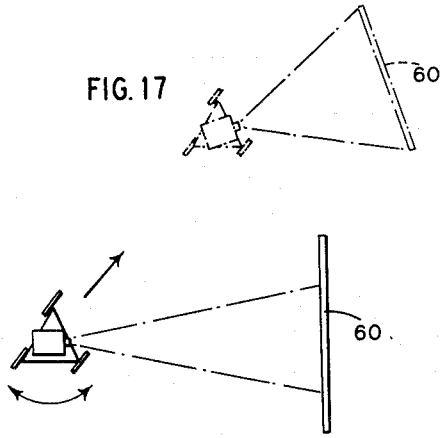
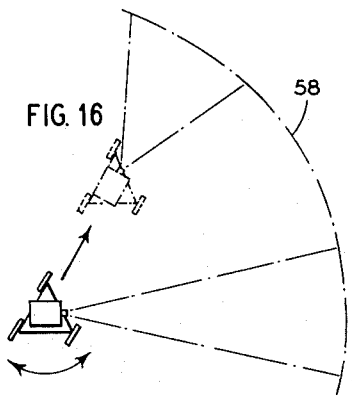
INVENTOR.
Newhall Douglas
BY
*Irving Seidman*
ATTORNEY

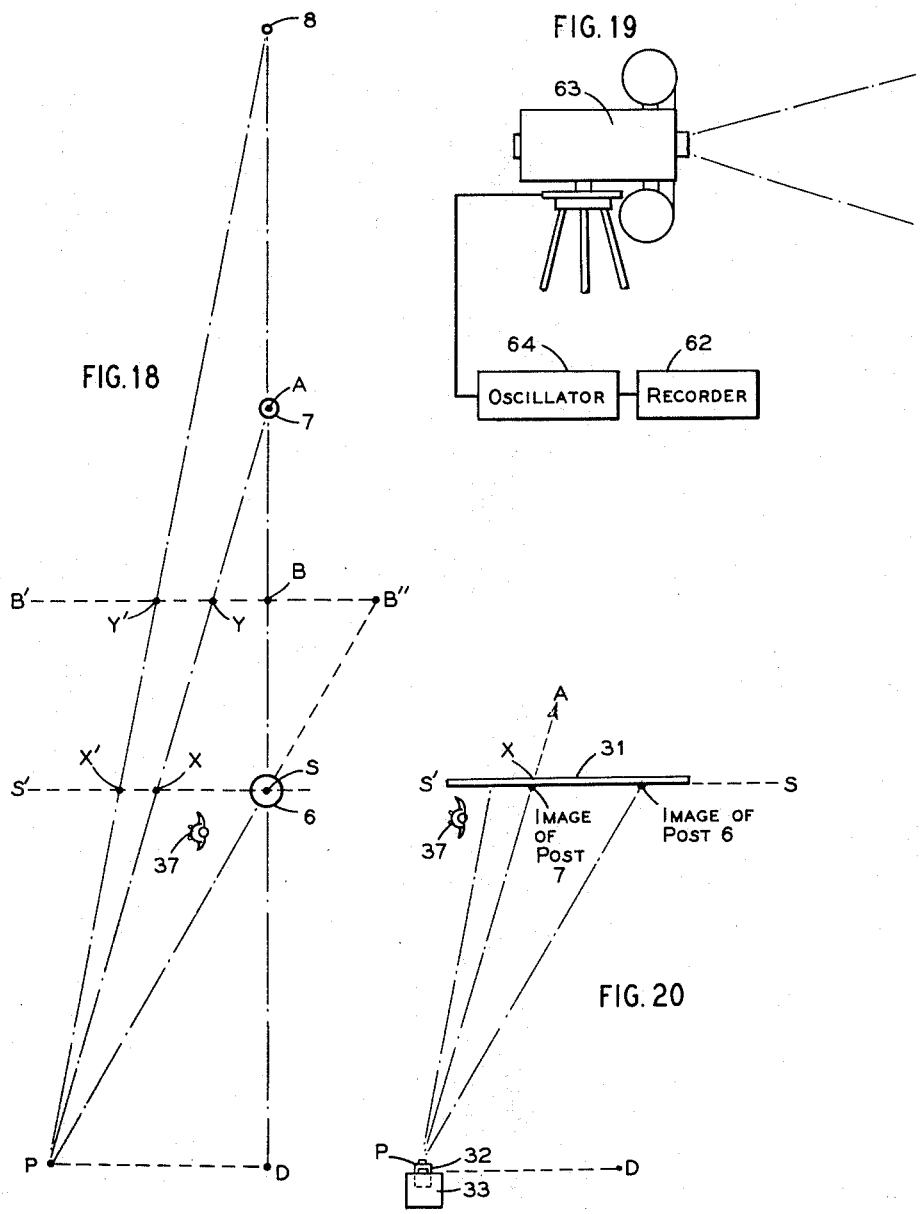

Feb. 6, 1962  N. DOUGLAS  3,019,696
SPACE-TIME REPRODUCTION OF SPATIALLY RECORDED IMAGES
Filed Oct. 15, 1956  12 Sheets-Sheet 8
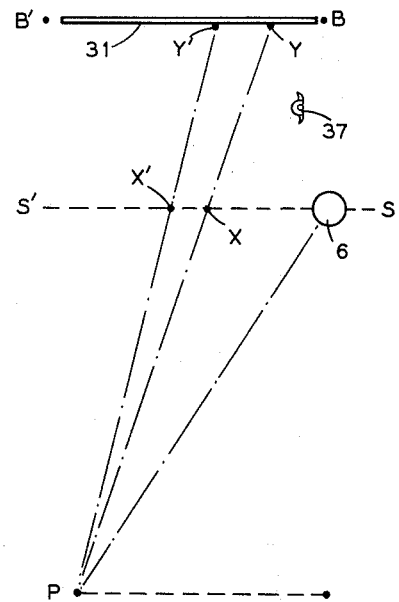
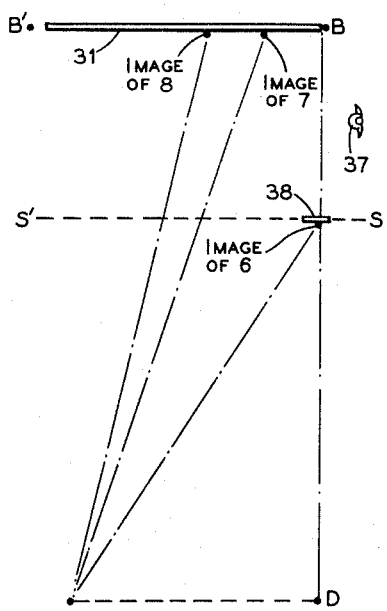
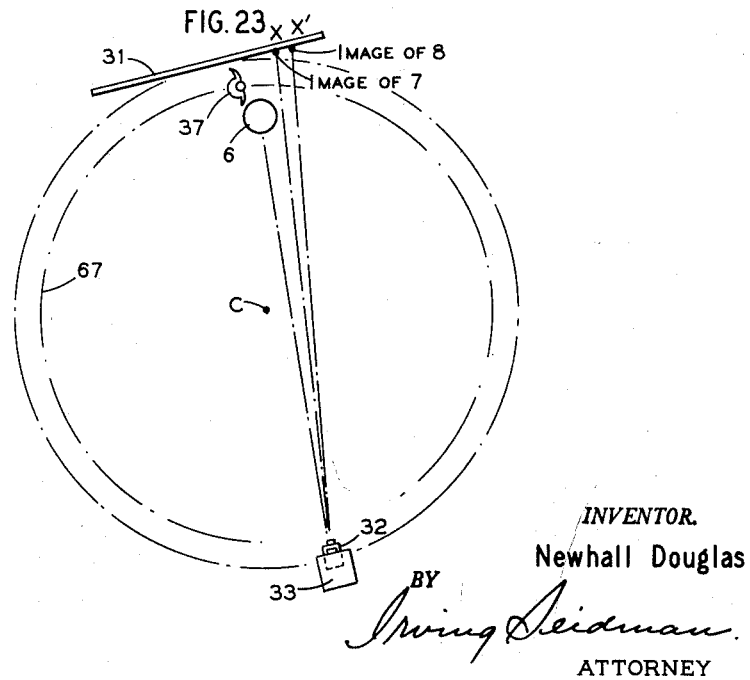
INVENTOR.
Newhall Douglas
BY
*Irving Seidman*
ATTORNEY

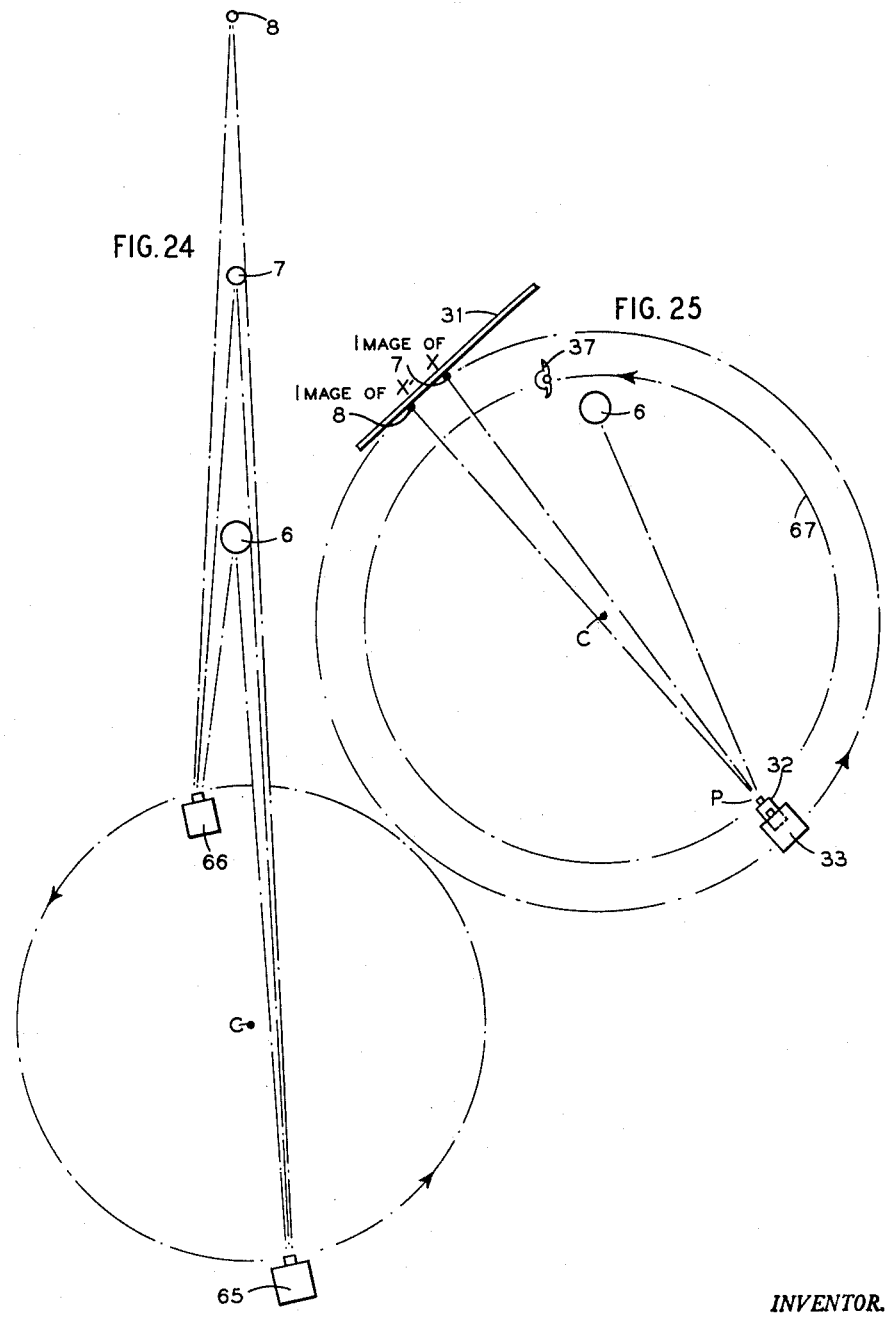

Feb. 6, 1962   N. DOUGLAS   3,019,696
SPACE-TIME REPRODUCTION OF SPATIALLY RECORDED IMAGES
Filed Oct. 15, 1956   12 Sheets-Sheet 10
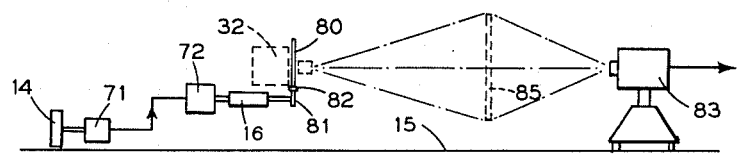
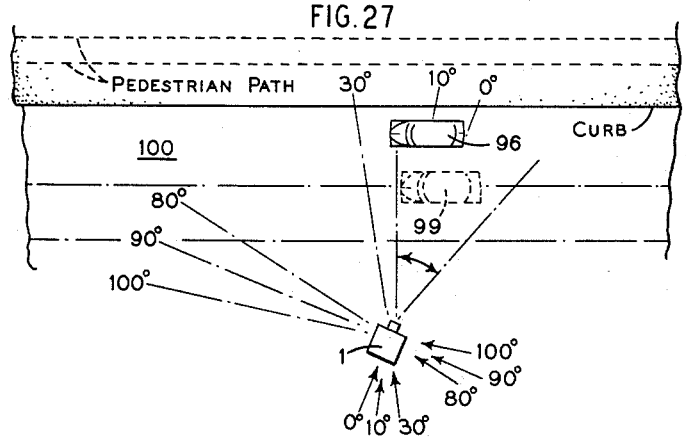
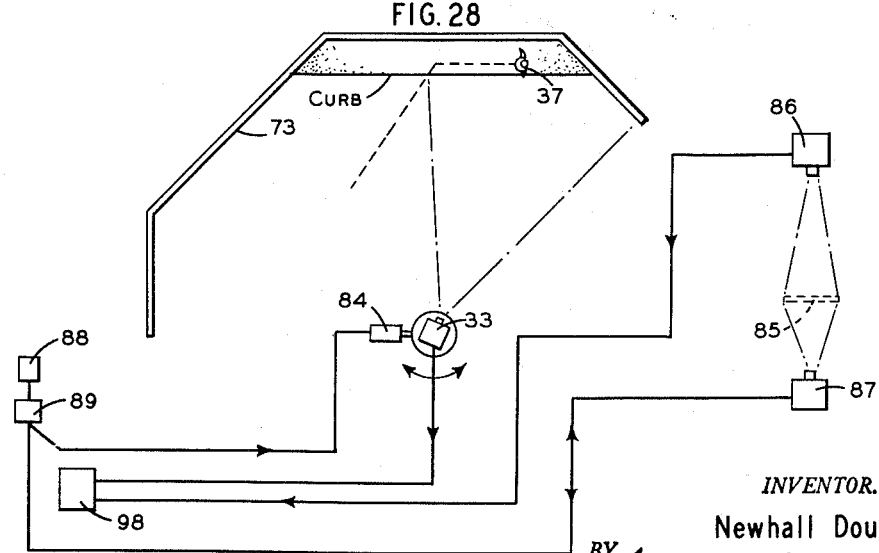
INVENTOR.
Newhall Douglas
BY
*Irving Seidman*
ATTORNEY Feb. 6, 1962 N. DOUGLAS 3,019,696
SPACE-TIME REPRODUCTION OF SPATIALLY RECORDED IMAGES
Filed Oct. 15, 1956 12 Sheets-Sheet 11

INVENTOR.
Newhall Douglas
BY
Irving Seidman
ATTORNEY

Feb. 6, 1962    N. DOUGLAS    3,019,696
SPACE-TIME REPRODUCTION OF SPATIALLY RECORDED IMAGES
Filed Oct. 15, 1956    12 Sheets-Sheet 12
FIG. 31
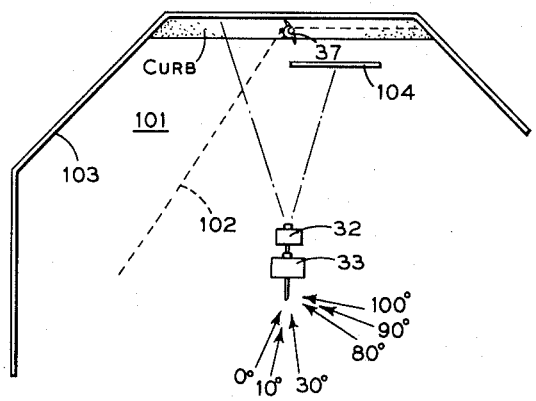
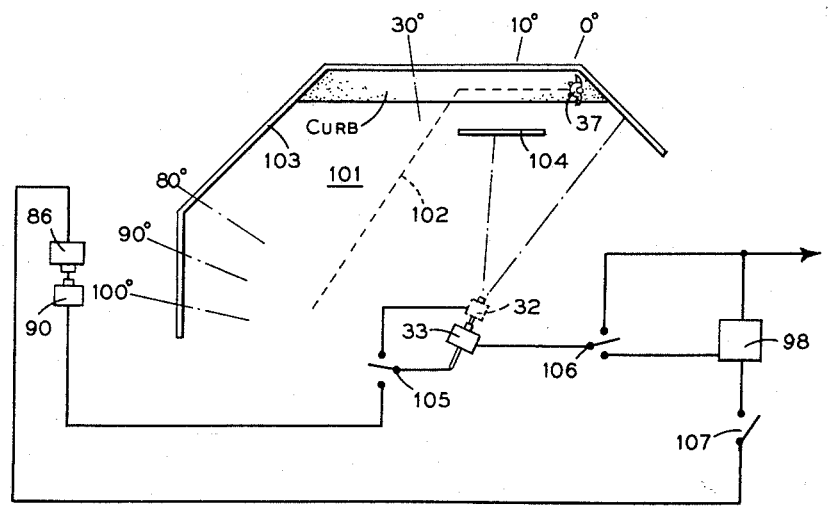
FIG. 32
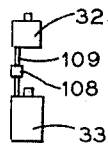
FIG. 33
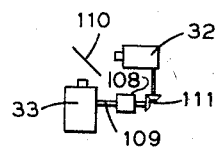
FIG. 34
INVENTOR.
Newhall Douglas
BY
*Irving Seidman*
ATTORNEY 3,019,696
SPACE-TIME REPRODUCTION OF SPATIALLY RECORDED IMAGES
Newhall Douglas, 517 Sherwood Road, Hohokus, N.J.
Filed Oct. 15, 1956, Ser. No. 616,017
9 Claims. (Cl. 88—16)

This invention relates to the photography of scenes and the subsequent projection thereof as images, particularly projected images of scenes to be employed as elements of a composite photograph including new elements such as actors. Such a "composite photograph" may constitute a motion picture or television pick up. Insofar as common aspects are concerned, the present application is a continuation-in-part of my copending application Serial No. 239,728, filed August 1, 1951, now Patent No. 2,822,720, issued February 11, 1958.

The operation of the camera in accordance with the invention differs from the conventional operation of a motion picture camera in the respect that it is only when the camera is in motion that the pictures it takes are a series of changing pictures which change to correspond to the changing view of the camera, because the change or sequence of pictures taken is governed not by the rate of a film transport motor but only by the position in space of the camera, which may change at any rate or time.

The camera of this invention differs from a regular motion picture camera in that, as a primary function, it does not stop motion of objects, but rather records their relative positions as the field of view of the camera moves past the objects, thus recording not the motion of the objects but the successive positions of the points of view of the camera. The position of the camera can be ascertained by analysis of the pictures, but a much more direct method is to predetermine the exposure of each frame as a function of intervals of space rather than of time.

The projector operation in accordance with the invention differs from that of both a motion picture projector and a "still slide" projector employing strip film in that, instead of changing at a constant rate without relation to dimensions of space, as in a motion picture projector, or without relation to any factor of scene or picture as in a still slide projector, the change of picture is governed only by change of position in space of the projector, with rate or time not a controlling factor.

This invention is intended primarily to photograph stationary or comparatively motionless objects and to project the images to attain an illusion of immobility with precise orientation. It is well known that a motion picture when projected does not move, or change its position in space. On the other hand, the pictures or images projected by this invention change position in space. The result, in which images of objects appear to be motionless as in reality, is attained by use of a true or literal moving picture. It is evident that the primary concept and purpose of this invention differs from a conventional motion picture system in that a motion picture system is designed primarily to photograph moving objects and to project the images of the objects to attain an illusion of motion without regard for orientation. Thus my invention requires a distinction between motion pictures and moving pictures.

The pictures used in my invention are not confined to images of motionless objects only, as under certain conditions later to be described my moving pictures have great advantages over motion pictures when they contain images of moving objects. Since my moving pictures may be used to follow an extemporaneous time pattern, the apparent motion of images within the pictures may also follow an extemporaneous pattern within wide bounds of time when under precise space control.

A principal object of the invention is to record three dimensions of scenes, each at its actual relative location, in such manner that the scenes can be reproduced in a studio in their true spatial dimensional depth. When time is not a factor in the recording of the scene, but only the three dimensions of space, such photographs under position, or space, control only, can be then employed with infinite flexibility of time as another dimension. As a consequence, the picture as scenes can be used at any time and through any period of time on a television program, for example. In the final composite picture, an actor can appear to move, not merely in front of but also among and behind the objects in the scene produced by projection of the three-dimensional recording. Since time is not a factor in the taking of the scene on location or its reproduction in the studio, the actor can move with complete and unrehearsed freedom. Furthermore, the distance the actor can appear to walk or run is not necessarily limited by the dimensions of the studio, although the actor moves relatively to the studio floor. For example, an actor on foot can start and stop at will with almost no limitations on the direction, duration or speed of his movement. Since my moving picture follows his movement it need not be at a predetermined rate, so no rehearsal to match a time course of a motion picture is required.

In motion pictures, when a dramatic situation requires actor movement of considerable length and duration, the actors and camera crew usually go on location, or large scenes are constructed outdoors on studio property. Either method is costly, and there are problems of interference such as noise, so such scenes are often attempted in a studio or by various "process" techniques which combine a previously taken scenic image with an image of action taken at another time, usually subsequent. Nearly all of these processes have limitations which are serious because of time, space or quality requirements.

Rear projection is in general the most satisfactory and frequently used of these "process" techniques, and the invention herein described is also applicable to rear projection. However, in conventional use of a stationary rear projector when the scene is of considerable extent, and the illusion of a "traveling" shot of the actor is desired, either the screen must be of such large size that it becomes impractical, or the actor must be placed on some sort of a vehicle, such as an automobile or a treadmill, so that he appears to move although actually remains relatively stationary in position. Many of these disadvantages, and others known in the art, are overcome by the use of my invention in rear or front projection.

The method and apparatus in accordance with my invention will be more clearly understood from the following description considered in connection with the drawings in which:

FIG. 4 illustrates a camera revolving about an axis behind it with translatory movement, taking a succession of pictures from a number of points.

FIG. 5 and FIG. 6 show that every picture taken by a camera in translatory movement from separated points is separate and different from every other picture, with the relative positions of images of separated objects changing in each picture.

FIG. 7 illustrates the method of controlling my "position" or dirigible camera to take successive views, not under rate or time control as in a conventional motion picture camera, but at intervals of space as controlled by position of the camera, by means of a variable transmission to variably adjust change of frames or change of area or field of view of a single picture.

FIG. 8 illustrates a mechanism to change the frames of the film to take an exposure at each camera position.

FIG. 9 shows the mechanical connection of the projector with the camera of FIG. 7 by illustrating certain common parts, with the film pulldown mechanism duplicated pull up the film so that the direction of film movement in the projector is reversible.

FIG. 10 is a plan view of the position projector, reproducing the scenes of FIG. 2 and FIG. 6 taken by the position camera, employed in a studio with new "live" elements to be taken by a conventional motion picture camera as a new composite picture, the camera and projector being one above the other in the same vertical plane.

FIG. 11 is a view in elevation of the situation of FIG. 10, also illustrating the use of screens and images in more than two dimensions with resultant changing overlay and interposition of images.

FIG. 12 shows the studio position-controlled projector duplicating the course of the location camera in "dolly" or "zoom" movement, with changing pictures projected on a stationary screen or a screen moving but maintaining the same position relative to the camera.

FIG. 13 shows apparatus to adjust lamp illumination, camera or projector focus, and angular size of projection automatically as a function of position.

FIG. 14 is a plan view of a projector projecting a single picture without change except for increase in the size of projected images with corresponding decrease in picture scope as it advances, or "zooms" toward, a stationary screen.

FIG. 15 shows a single extended picture, only a part of which is projected at one time, with change accomplished by projection of new areas of the one picture rather than by changing pictures or frames.

FIG. 16 shows moving projection of a single picture on a stationary screen in three dimensions by change of projected area and angular size of projection.

FIG. 17 shows two dimensions of movement of a projector with optional change of projection lens angle in the projection of a single picture on a movable screen.

FIG. 18 shows the basic proportions from which the formula is derived to locate the changing positions of the intersection line of sight of an object from different points with that of a plane such as a screen.

FIG. 19 shows apparatus to obtain position control of changes of frames for spatial projection of a picture taken under time control by a conventional motion picture camera operating at a constant rate.

FIG. 20 shows in plan view the reproduction in a studio of the spatial situation of FIG. 18 by a position-controlled projector.

FIG. 21 shows the combination of the recorded scene with new three dimensional elements in the studio to produce a composite picture with correct apparent dimensional depth.

FIG. 22 shows the situation of FIG. 18 reproduced in three dimensions allowing interposition of new moving elements apparently within the three dimensions of projection of the recorded elements in the resultant composite picture.

FIG. 23 shows the exact positions of images in a scene reproduced by a projector duplicating the course of a camera revolving with aspect toward the axis of rotation.

FIG. 24 shows the opposite change of direction of the line of sight of objects with consequent difference in the interpositional movement of images taken by two cameras both in panning movement in the same angular direction about an axis C, but with the axis before one camera and behind the other.

FIG. 25 shows adjusted position of images to provide an illusion of continuation of movement in one direction when a projector revolving in an orbit with the axis before the projector and the aspect of projection toward the axis.

FIG. 26 shows apparatus to move a slide in a projector, an opaque picture, a model or a camera in response to the movement of a studio camera tracking a moving object and in relation to the movement of the studio camera.

FIG. 27 shows a plan view of a "location" street with moving objects and motionless objects to be photographed at successive camera aspects.

FIG. 28 shows a two-camera matting technique with the position of the studio camera controlled by the playback of a record of motion in synchronism with a remote projector with a constant frame change rate.

FIG. 31 shows the apparatus to reproduce images in three dimensions of both moving and stationary objects employing movement of a studio projector with frame change under position control.

FIG. 32 shows apparatus to reproduce images in three dimensions of moving objects and motionless objects employing two cameras in a matting process, with a change of frame of a stationary remote projector controlled by the change of position of a studio camera.

FIGS. 33 and 34 illustrate alternative driving arrangements for the studio projector-camera unit.

Figure 1:
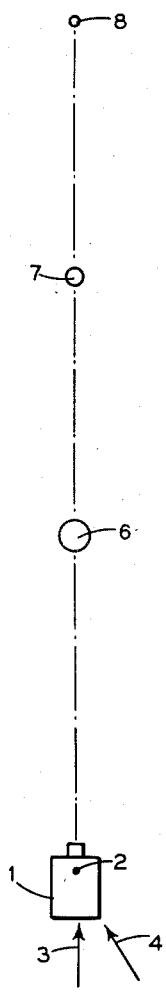
FIG. 1 illustrates a changing frame camera rotating about an axis without translatory movement, taking a succession of pictures of a scene from a single point.
Figure 2:
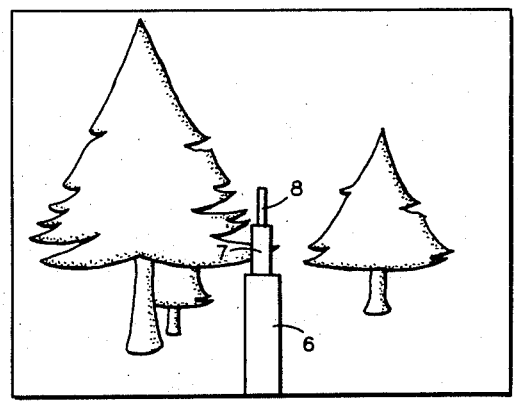
FIG. 2 and FIG. 3 show that the relative positions or aspects of images of objects do not change when the view of a camera changing frames to take successive pictures changes position in rotary movement only.
Figure 3:
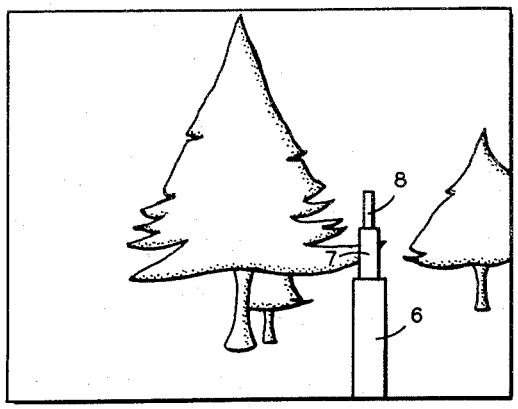

In recording a scene by photography on location, a motion picture camera 1 may be rotated, or panned, on substantially the axis 2 as shown in FIG. 1. FIG. 2 shows the view of the camera 1 in aspect 3; FIG. 3 shows the view in aspect 4. In both views, the relative positions of the images of posts 6, 7 and 8 are identical, and little or no illusion of third dimension results.

Such a method of photography produces a series of contiguous pictures with identical common portions, and which could be pasted together to make a single homogeneous picture in the nature of a panorama. To produce such a picture, it is not necessary that the scene have any true dimensional depth. An identical print could be produced by a camera photographing a painting on a two-dimensional surface at any distance from the camera. Therefore, FIGS. 2 and 3 are essentially a two-dimensional record of a scene.

When a motion picture camera 1 as shown in FIG. 4 is revolved about an axis 2 at an appreciable distance from the camera, as on boom 9 shown, a very different result is attained. As shown in FIGS. 5 and 6 taken respectively from aspects 10 and 11 in FIG. 4, the two views are not homogeneous, and, as they have no identical portions, could not be pasted together or in any way considered as a single continuous picture in only two dimensions. In FIG. 6 the relative positions of the images of posts 6, 7 and 8 show significant change from those in FIG. 5. Views of FIG. 2 and FIG. 5 are almost identical, as the aspect is angularly the same.

The change in relative positions is not a function solely of line or movement, but of change of position from one point of view to another which results in a significant change in the angular aspect of view.

The camera may move in any direction; and while only one dimension of control is shown, the camera may be under two or more dimensions of control, such as simultaneously panning and tilting, with an effect shown in the spatial recording of each scenic picture in accordance with the position of the camera.

Since the pictures shown contain views of immobile objects only, they could be taken one picture at a time through a period of time of any duration. A conventional motion picture camera is a convenient apparatus for taking the location pictures, but this camera and a conventional projector do not constitute a combination sufficient to reproduce the pictures with any degree of accuracy in resultant orientation. The primary concept of a motion picture camera-projector is to photograph images, such as moving objects, with a succession of photographs sufficiently rapid to "stop" motion in each photograph, and to project them at the same rate to attain an illusion of motion. The camera of this invention as a primary function does not stop motion of objects, since they are preferably already motionless, but rather records their relative positions as the field of view of the camera moves past them, thus recording not the motion of the objects but the successive positions of the points of view of the camera. The position of the camera can be ascertained by analysis of the pictures, but a much more direct method is to predetermine the exposure of each frame as a function of intervals of space, rather than time.

The setting of such a spatial relationship is important when the camera is given rotary movement only, but becomes of paramount importance when the movement of the camera is translatory, because then the relationship of the camera to every object photographed undergoes constant change, intermittently recorded by the changing frames, with no two frames identical.

The method of producing the intermittent views required for the separated pictures taken at each position is shown in the position control diagrams of FIGS. 7 and 8. Movement of the film as a whole is at a rate relative to movement of the camera, but exposure occurs at increments of spatial measurements, such as in panning at each change of angle of one minute of angle or in trucking at each inch of movement. In FIG. 7, position pick-up wheel 14 rolls on the floor and thus rotates to correspond to the movement of the camera mount relative to floor or ground 15. Its rotation is communicated to stepless variable ratio transmission 16, which turns commutator 17 and film sprockets 18 and 19. Switch 20, when contacted by pins 21 on commutator 17, actuates the shutter and frame change mechanism shown in FIG. 8.

In FIG. 8, solenoid 24 actuates frame change lever 25 and shutter 26 when energized by the commutator of FIG. 7.

So controlled by position, the film itself can be used as a measurement of space by comparison of images on successive frames of the film in a manner similar to that of a range finder, since the point of view of each frame is separated by pre-set intervals of linear measurement. As the camera pans at axis 2 in FIG. 1, it will take the picture shown in FIG. 2 at aspect 3 of FIG. 1, and the picture of FIG. 3 at the second position of aspect 4 of FIG. 1, no matter when it reaches each position.

Likewise, it takes the pictures of FIG. 5 and FIG. 6 at any time from aspects 10 and 11 of FIG. 4.

Therefore the record contained on the film is not of a space-time course as on the film of a conventional motion picture camera as a result of movement of the camera through space while operating at a constant film transport rate, but simply a record of a space course. To reproduce a course governed only by spatial relations is a much less complex problem than reproduction of a space-time course where it is necessary in order to have a complete reproduction of the motion to have a record and reproduction of how the camera altered its position with time. In other words, for every point on a trajectory where a picture was taken it must be clear at what time the camera was situated there, and the reproduction must correspond relative to the time. This is more fully explained in my copending application Ser. No. 239,728, filed August 1, 1951, now Patent No. 2,822,720.

One problem not previously solved was to reproduce the pictures taken by a first location camera so that the images appear in positions relatively correct in proportion to the three dimensional location of the objects and to photograph the images by a second studio camera including new objects such as an actor moving on a path at an unpredictable time and rate for a distance greater than the size of the projected portion of the whole scenic image so that his image and that of scenic images combine in the final composite picture in three dimensional, but not necessarily exact representation, positions and proportions.

To accomplish this with a three dimensional effect, so that images of objects at a distance show views from more than one point and images move relative to the path of the actor to place them apparently in the same position as the objects in reality, it is necessary to move the second camera in the studio and to change the scenic picture at a velocity which is relative to the velocity of the studio camera or at the invervals of position of the studio camera.

To accomplish reproduction of the dimensional aspects of the location scene as a part of a composite picture in the manner with the greatest advantages of simplicity, a reproducer is required which is mechanically connected with camera 1 of FIG. 1 by common parts. This is accomplished by identical film and control system to change the film in the projector as for the camera, as shown in FIGS. 7 and 8. When the camera was under position control to first expose the film, a projector exposing the same film used as a mechanical link or measuring device between camera and projector and under identical position control, can project images which appear to be in three-dimensional positions precisely the same as those of the objects in reality.

The frame change mechanism of the projector as shown in FIG. 9 is identical to that of the camera in FIG. 7 and FIG. 8, with the exception that solenoid 24, frame change lever 25 and shutter 26 are duplicated in opposite sense so that the film in the projector is reversible.

When commutator 17 of FIG. 9 is turned, as shown also in FIG. 7, for motion in one direction, pin 21 bends leaf spring switch 20 to touch screw adjustable contact 28 actuating the shutter and pull down cycle. When commutator 17 rotates in the opposite direction, pin 21 bends spring 20 to touch contact 29 to cause pull-up of the film in the opposite direction.

FIGS. 10 and 11 show the studio employment of the apparatus described in connection with FIGS. 1 to 9 in producing a new composite picture by means of the front projection methods of my copending application Ser. No. 461,195, filed October 8, 1954. Projector 32 projects images of background objects on screen 31 and images of foreground objects on screen 38, both composed of reflex-reflector material. As projector 32 changes position, the projected picture changes as explained in connection with FIG. 9 to provide a scene on screen areas encompassing the images of the changing positions of a new moving object such as an actor 36 in the view of camera 33. Camera 33 moves in unison with projector 32 and photographs the scenic image and new object simultaneously.

Camera 1 may take the outdoor scene of FIGS. 2 and 5 once, traveling in one direction, but the projector projecting the scenic image on screen 31 of FIG. 10 may travel through its course to show the images of the scene of FIGS. 2 or 5 recorded on the film not only at any rate, but back and forth continuously, reversing the direction of the film transport, any desired number of times. For example, post 6 in FIG. 2 may be an extremely important focal point in a detective story. Any number of times projector 32 in FIG. 10 and studio camera 33 may swing to the right from aspect 34 to aspect 35 to take characters such as actor 36 walking to the right past the image of the post, or to the left, or any part of these sequences.

In studio reproduction of the location scene as an element in a new composite picture, a conventional rate controlled motion picture or television camera may be used to make a new recording of the composite scene. Additional elements may be screens, properties placed before, behind or in interposition between screens, a device under position control to form the changing image such as a projector, and the usual components of any television scene such as actors, lights, microphones, etc.

With studio camera and studio projector maintaining the same positions relative to each other, any course of movement of a location camera can be duplicated, with photography including the addition of images such as of actors, properties or other scenery taken with the reproduced scene as a part of the final composite picture, all appearing in correct perspective or dimensional relationships including the dimension of time.

Change of picture by position control is extremely important when multiplane screen surfaces in three dimensions, such as small screens in front of big screens, are employed to receive the projected images, as then the projected rays carrying the light patterns to give the differently positioned surfaces the appearance of reality need be precise in their placement. A "run through" or trial run at any rate, taking any required amount of time, may be made so that the positions of the surfaces can be set with absolute certainty. When the receiving surfaces match the projection through the whole run, then while the linear course must be preserved by marking on the floor, setting steering apparatus or other means for repetition, or the center point of the panning shots ascertained, the projector can be moved to any position of the run and remain there until its effect is needed. Running to any position previously established will automatically produce the image corresponding to the desired situation. In FIG. 10 actor 37 stands in the projection of projector 32 and the view of camera 33. The previously recorded background scene is projected on background screen 31. A recorded image of a foreground object, such as post 6 is projected on foreground screen 38. If actor 37 stands motionless in the position shown, his image is separated from that of the post as shown in FIG. 11 and the shape of screen 38 need not exactly match the outlines of post image 40. However, if an actor 36 stands motionless in the position shown in FIG. 10, part of the image of his body will be combined with the foreground image 40 in the final composite picture, as it will overlay his image. View of his body will be cut off not by the image 40 but by the actual contours of screen 38.

One of the major advantages of this invention is the extreme latitude it allows in the shape and position of screens which receive projected light patterns to represent scenic objects. In FIGS. 10 and 11 if actor 37 passes behind screen 38 through the position of actor 36 no more rapidly than at a normal walk, the eye will not perceive the instant when there is a difference between the shape of the screen 38 and image 40, as the time during which apparent overlay and interposition does not duplicate reality is very short.

In FIG. 11 screens 31 and 38 need not be in a single plane at right angles to the axis of projection, and may be either two or three dimensional though supplying a three dimensional image of a three dimensional object.

One method of making a "dolly" or "zoom" shot using process techniques to attain a new composite image by means of my invention is shown in FIG. 12. The film used is taken by the location camera moving either forward or back while taking the location scene. The course need not be a straight line, but can contain curves. The film is placed in variable position controlled studio projector 32 of FIG. 12, associated with camera 33 as in FIG. 10. The projector 32 with its associated screen 31 and studio camera 33 retaining the same positions relative to the projector, moves through positions 42 and 43, in direction and extent relative to that of the location camera which took the scenic setting, at any time and at any rate or speed of change of position relative to the studio floor, with consequent change of film frames according to the situation of the projector. By this method, no change in either camera or projector lens is required although it may be advisable to make adjustments to maintain sharpness of camera focus on the actor 37. Since the screen 31 remains at a constant distance from the projector lens as shown in FIG. 12 in screen positions 44 and 45 no adjustment in the operation of the projector is required.

A second method accomplished by position control of focus of the zoom projection projector enables the screen to remain stationary but provides a changing picture as above. In FIG. 12, projector 32 and camera 33 advance toward or retreat from actor 37 and screen 31. Frames change according to the position of the projector, exactly as above, to make the projected image become progressively larger but of decreased field with advance or the converse with retreat. Camera 33 in positions 42 and 43 will receive an image from the stationary screen identical to that projected on the screen when the screen moves with its position relative to camera 33 unchanged, as the angular incidence of the reflected rays is approximately the same.

In cases where the reflected intensity changes as the actual screen area covered by projection changes, the intensity of light projected may be varied as a function of change of position. The apparatus to accomplish this is shown in FIG. 13. As wheel 47 rotates as it moves on the floor, shafts 48 and 49 adjust rheostat 50 to vary the light intensity of lamp 51. Focus of the camera 33 and projector 32 of FIG. 14 may also be controlled by the position of wheel 47 of FIG. 13, communicated to lens adjustment system 52, which may be a geared zoom projection lens system, and by shaft 48.

Either of the above methods will result in a composite picture which in changing size and relative positions of scenic image and actor image precisely duplicates reality.

Another method of making "dolly in" or "out" shots by means of my invention for use in front projection is shown in FIG. 14. This is convenient because projector and camera move maintaining the same positions relative to each other, but the screen does not move and the film in the projector does not move or change. Therefore a trucking or panning sequence can be stopped, and motion in a direction not recorded accomplished. As in the other features of my invention, there is no rate or time control, all control being accomplished by change of position. As projector 32 of FIG. 14 and its associated camera 33, constructed as before, dolly in toward actor 37 and screen 31, the angular width of the projection of the lens system of the projector 32 becomes larger automatically as also shown in FIG. 13 from width 54 to width 55, for example, actuated by the position signal or control from wheel 47, transmitted to the projection lens adjustment system 52 by shaft 48. Thus the scenic images on one frame of the film will appear to "grow" in size as the actor 37 and screen 31 are approached, and the amount of "growth" can be set by cams or other variable transmission means so that the apparent size of projected images of scenic objects relative to that of the actor image approximates real life very closely. As the projector and camera move in FIG. 14 from position 42, through interposed positions to position 43, composite images similar to those of the moving camera of FIG. 12 will be seen. The advantage of this method is that one picture is used for the scene and less studio space is used, with no requirement to provide space for a moving screen.

To project successive areas of a single extended picture with the projector using position controls as shown in FIG. 7, the entire projector is turned 90° about its projection axis, viz., on its side, so that a single picture (which could be produced by printing FIGS. 2 and 3 as a single continuous picture) moves horizontally and continuously an appropriate distance through the projector at a velocity relative to position change of the projector instead of moving vertically and intermittently as in a changing frame projector. Switch 20 of FIG. 7 is in that case disconnected so that the frame change apparatus is inoperative. Instead of loose "loops" as is customary with a changing frame projector, the film is pulled tight between sprocket 18 and sprocket 19. The proper ratio to move a single continuous picture to show successive areas is adjusted by variable transmission 16 of FIG. 7 so that the images on the screen appear stationary although the projector and projected picture area are moving.

The above capability of angular change of projection allows the studio projector to move in a direction not related to motion of the location camera. As shown, the vertical position of the center of the projected picture is the same relative to ground. One of the changing frames or one area of a single picture may be employed in panning or tilting projector movements, or both combined, so that the projected picture also may move up and down relative to the studio floor, and also in any dierction in translatory movement by means of a combination of movement of the film, projector and change of angular diameter of projection.

For example, as shown in FIG. 15 only a portion of vertical and horizontal dimensions of the scene contained in a slide or frame may be projected, as would be accomplished by the use of a 35 mm. frame 56 with a 16 mm. projection system. As indicated, the projected area 57 of the film may change in any direction within the projector to correspond to either rotary or translatory movement of the projector. Thus a large slide may contain an image which may be projected to successively occupy, by universal movement of the projector, all areas of a concave dome shaped screen 58 as shown in elevation view section in FIG. 16, or by suitable projector movements, all areas on a moving screen 60 as shown in FIG. 17.

As shown in FIG. 18, a receptor such as a camera at point D will view posts 6, 7 and 8 in line. With even a minute change of position changing the angular aspect, the images will no longer be in line. The relative change of image position may be slight when resulting from camera revolution about an axis at a relatively small distance therefrom as shown in FIG. 4. Or as in FIG. 18 a maximum change of image position in proportion to amount of linear movement results when the change of position of the camera is on a line at right angles to the first line of view, as then there is the greatest linear change concurrent with greatest angular change. Movement on the line of view results in no change of angular aspect.

The point at which the line of sight of an image viewed by a receptor, such as a camera, from a changed position intersects any plane parallel to the plane of change of position of the receptor may be located by a precise mathematical formula. In FIG. 18 when the receptor moves from position D to position P, the line of sight for each post changes. Considering the intersection of the lines of sight with a plane through SS' first, the image of post 6 is at the same position, but the line of sight of post 7 intersects at point X and of post 8 at point X'.

The formula to locate the intersection is as follows, applied to post 7 to locate the intersection of its line of sight with a plane through SS' from position P, (1) $$XS = PD\left(\frac{AD-DS}{AD}\right)$$

The same ratio $$\frac{AD-DS}{AD}$$

may be used to ascertain the velocity of an image relative to ground with a rate controlled projector in the formula (2) $$VI = VP\left(\frac{AD-DS}{AD}\right)$$

where VI is the velocity of the image and VP is the velocity of the projector. This formula would be used with a rate controlled projector in translatory motion and in that respect the present application constitutes a continuation in part of my mentioned copending application Serial No. 239,728, filed August 1, 1951, now Patent No. 2,822,720.

In FIG. 19, the conventional projector with a constant frame change rate projecting a panned or trucked movie is moved at a rate which will project each frame in the desired position, which is usually so that the projected images take the same relative position as the images of objects when the film was taken. While the rate of movement of the camera had no relationship to the rate of change of frames, the rate of movement of the projector is related to the change of frames in the sense that the rate of movement of the projector must correspond to the change of image position if it is desired that images of objects which were motionless when photographed appear to be motionless when projected, and images of objects which had appreciable transitory movement appear to have the same movement when projected. For example a projector may rotate at an angular rate of 16 minutes of angle per second to duplicate the motion of a camera operating at "silent speed" of 16 frames a second if the projector is also operating at 16 frames per second. If the projector runs the same film at "sound speed" of 24 frames per second, it will have to rotate at 24 minutes of angle per second to produce the same effect viz., image positions. The movement of the "silient" or "sound speed" projector is essentially governed by the desired position of images, but a projector which has a constant rate of change of frame imposes a limiting factor of time. In the above mentioned Patent No. 2,822,720, movement of the studio projector and associated studio camera follows frame change: In this invention frame change follows movement. In the above mentioned Patent No. 2,822,720 projection of a first frame is followed by projection of any subsequent frame after a certain period of time, regardless of place: In this invention a frame is projected only at a certain place, regardless of time.

The simplest method of changing control of change of frames from rate to position may be used when the rate of movement of the location camera is constant. In that case the intervals of space between changes of frame are all equal, and projection of the film by a position controlled moving studio projector is a simple matter of setting the variable transmisison 16 so that frames will change on projection at the desired intervals of space as the projector changes position as explained in connection with FIGS. 7, 8 and 9. In any method of change from rate to position control of change of frames, it is assumed that the location camera was in constant motion, or that duplicate frames photographed by the stationary operation of a "movie" camera are omitted.

When the location camera changes position, or moves, at a rate not constant, as is almost invariably the case, the conversion of control is somewhat more complex in concept. An intermediate step of analysis is required and the preparation of a space record which runs not in proportion to the film movement through the projector as would a sound track or synchronized magnetic tape but in proportion to the rotary or translatory movement of the projector. This record may be made with paper tape in recorder 62 of FIG. 19 running over a drum operated in a manner similar to commutator 17 of FIG. 7 and FIG. 9 which moves in accordance with the movement of analysis projector 63, during the analysis, and in accordance with the movement of studio projector 32 during projection of the film by the latter (FIG. 20). Oscillator 64 of FIG. 19 runs at a constant rate, with each impulse synchronous with the incidence of each exposure of frame change by analysis projector 63. Each impulse of oscillator 64 causes a punch in recorder 62 to cut a hole in the tape, with each hole being used to make a contact on playback by position control at the same point in space of the studio projector 32 and point on the tape corresponding to a frame change at a recorded position. Electrical signals recorded on magnetic tape may also be used in a similar manner. If the trucking or panning movement of the location camera were slow, it exposed many frames per inch of movement, and therefore the analysis projector 63 changing frames at the same rate and moving at the same rate will put many signals on the tape per foot of the tape. If the location camera and analysis projector 63 move rapidly, there will be few changes of frame signals on each foot of tape.

To play back the record so that the frames may be projected at the correct positions regardless of rate or time, the film is placed in a projector which changes frames not at a constant rate but once for each signal, as described in connection with FIGS. 7, 8 and 9, now with the signal being created by holes in tape moved by the position of the projector over a drum operated in a manner similar to commutator 17 of FIG. 9.

Referring to the present invention, to "play back" the change of frame under position control in a studio, the film is placed in a projector such as 32 of FIG. 10 which changes frames not at a constant rate but once for each signal, now with the source of the signal being holes in tape moved relatively to the position of the projector. The tape is pulled past leaf spring switch 20 of FIGS. 7 and 9 over a drum operated in a manner similar to commutator 17. Feed and take-up is accomplished by sprockets like 18 and 19. At each hole in the tape, switch blade 20 closes an electric circuit, energizing either solenoid 24 or solenoid 27 of FIGS. 8 and 9, depending upon the direction of movement of the tape. Since the holes reach the switch blade only in response to a change of position of the projector 32 and are punched at intervals which will project the image on a changed frame of film in the desired new position, the projected images automatically appear in the same relative positions as the images of the location objects.

To reproduce in a studio an illusion of the spatial limits shown in FIG. 18 with intervening views included, a series of pictures of posts 6, 7 and 8 are first taken by a location camera while moving from position D to position P as shown in FIG. 18. These are placed in movable studio projector 32 of FIG. 20, projected on a screen at SS' and viewed by studio camera 33. The projector and camera may be moved as is explained on connection with FIG. 10. To "track" actor 37, keeping him within the projector camera field, projector-camera 32 and 33 moves on line PD, and the image of post 7 is projected from point P to appear again at point X, now in the plane of the screen 31. The image of post 6, although correctly showing a different aspect of the post, remains stationary, since the screen surface bears the same relation to the projector as the post bore to the camera.

If the screen is placed in the position of line BB' of FIG. 18, then the formula to find the position of the image of post 7 on the screen becomes (3) $$YB = PD\left(\frac{AD - BD}{AD}\right)$$

In this case, if it is assumed that post 6 was not present in the location scene, but is placed in the studio as a scenic property as shown in FIG. 21 to appear to be like the images of posts 7 and 8 of FIG. 18, the interposition of the composite picture taken from P will be as correct as when the screen is in position SS' and receives the projected image of post 7, as before.

With the size of the screen 31 sufficient to reflect the whole projection in the plane through BB', the image of post 6 may be projected on a small screen 38 as shown in FIG. 22 shaped to conform to post 6 at the intersection of lines SS' and DB; and the path of the actor may be between lines SS' and BB', so that he can pass behind the image of post 6 to form a composite image the same as would be produced if he had walked behind post 6 on location as in FIG. 18 or post 6 as in FIG. 21 which comprises a three dimensional studio property.

Projection of the images of a scene so that the scene appears relatively larger or smaller in proportion to the apparent size of images of other objects, such as an actor or foreground properties, will make the scene appear closer to or farther away from the camera taking actor and scenic image as a composite picture. This method may be used to adjust the apparent dimensional depth of a scene to a limited degree. By employing a variable position controlled projector as in this invention, projection and reception of changing views of objects, with consequent interposition or overlay of foreground contours, provides the most indicative evidence of dimensional depth, regardless of apparent distance or size, and this as well as the apparent relative sizes of scenic images may be adjusted to increase the impression of depth. However, simple size adjustment does not give the maximum advantages in variation of depth impression without correlation with other adjustment. If multiple or changing views of a scene with much interposition of multiplane surfaces are used, so that near objects cut off all or part of the view of distant objects, the perspective aspect and consequent relative angular view and sizes of objects will be incorrect if size only is changed. Interposition is dependent on the distance and aspect of the location camera taking the scene relative to the scenic objects and images, and such change in this relation when projected will result in incorrect perspective relationships.

A much better and more nearly correct result is attained if the "drift" and size of images behind a moving actor are adjusted or controlled simultaneously. This is attained by position control employing an adjustable variable ratio transmission 16 as shown in FIG. 7. Assuming that location camera 1 of FIG. 4 and projector 32 of FIG. 10 are equipped with duplicate position controls and the changing pictures are projected by projector 32 on a stationary or moving screen in the plane of screen 31 of FIG. 10 so that the images will appear the same size as the corresponding objects on location in relation to the image of actor 37, then if the mentioned pictures were taken by a location camera moving in translation as in FIG. 4, the projected images will automatically take changing positions in the successive views of the final composite picture when projected by a moving projector which apparently places them in positions to correspond to the positions of objects in the original scene in their distance, or position, relative to a studio camera 33 employed in recording the composite scene and moving with the projector. Thus the posts in the projected scenic image will appear to be the same distance, not only because of size but also position and aspect, from the studio camera as they were from the location camera recording the scene for studio use. In this case, variable transmission 16 of FIG. 7 may be set at a 1 to 1 ratio so that it transmits motion as would a solid shaft.

Often "forced perspective" is used in motion picture scenic design, in which three dimensional scenic elements are used diminishing in size to a greater degree than their actual distance of position from point of view would allow in reality. These are very successful when viewed from one exact point, but almost no variability of position of view is possible and there is little latitude in actor placement or movement, in my invention herein described, perspective depth can be adjusted to give a greater illusion of depth and expanse than present in the actual physical dimensions of the spaces, or intervals of either the recorded scene or the studio situation of the re-created scene, without limitations on actor movement imposed by the adjustment of depth impression.

When it is desirable to make the background appear farther away from the actor, the image of post 6 may also be given a change of relative position when projected, as the realistic effect will be destroyed if it is also projected at position S in FIG. 20 when viewed from position P as a part of the tracking sequence from position D. To make the image of post 6 of FIG. 18 appear to be in the position of post 7 in FIG. 20, for example, value AD in the above formula $$XS = PD\left(\frac{AD - DS}{AD}\right)$$

represents not the actual distance, as shown in FIG. 18, but the desired apparent distance AD in FIG. 20, an arbitrary figure.

This adjustment of perspective depth can be made in one plane only because the projected image is recorded in a single plane, such as a film. In the case of a changing frame projector, the adjusted perspective change can be correct for the adjusted size of images in one of the planes represented, with the perspective change in other planes proportional to the selected plane. The method is exactly correct for the picture as a whole when the location scene is essentially in a single plane, such as a building wall, and thus is ideally suited to a slide projector employing a single two dimensional picture.

Thus when change of apparent size to adjust the illusion of distance is employed, a more accurate representation is attained and the appearance of perspective depth of the scene enhanced or better expressed if the apparent distance from the camera of the images on the screen is adjusted so there is a difference in apparent relative position, as well as relative size, by proper setting of the variable transmission 16 as shown in FIG. 7 so that the change of exposed area is at a faster or slower rate than that used in the "location take" relative to the movement of the location camera and the moving reproduction by the projector. For example, if the images are reduced in size so that the "drift" or movement with the actor should be greater, variable transmission 16 of FIG. 7 is set to change the pictures at a ratio less than 1 to 1, which may be 2 to 1 if apparent distance is doubled. If the images are enlarged about twice in size, the transmission is set to change pictures at a more rapid rate than the location ratio, such as 1 to 2.

The image of post 8 in FIG. 18 is reduced in size when projected, and as the projector moves to "track" the actor 37, variable transmission 16 of FIG. 7 is set so that if actor 37 is held in the center of the field of view, the image of post 8 moves slightly less relative to the floor than the actor. For example, if the image of post 8 is reduced in size one half to double the apparent distance so that it appears to be not 45 but 90 feet away, then while the actor moves 1 foot relative to the studio floor, the image of post 8 would move $75/90$ of a foot relative to the studio floor. This relative image movement is ascertained by the employment of the formula $$XS = PD\left(\frac{AD - DS}{AD}\right)$$

When the image of post 8 is reduced in size, XS represents the movement of the image relative to the studio floor, AD the apparent distance of the image, 90 feet as stated, DS the distance of the projector to screen, 15 feet, so the ration $$\left(\frac{AD - DS}{AD}\right) \text{ becomes } \left(\frac{90 - 15}{90}\right)$$

or $75/90$. Since the actor is held in the center of the field of view, and the camera moves parallel to his movement, the movement of the camera is the same as his movement, so PD is 1 foot, and 1 ($75/90$) results in the solution of the image movement $XS = 75/90$ of a foot.

In many cases, particularly where the length of a studio is short, it is desirable to use a changing picture taken by translatory motion, even on a straight line, or a picture taken from a single point, and projected by rotary motion as the actor walks on a curve but with the illusion of the actor walking on a straight line. Conversely, it may not be possible to move a camera in translation in the location scene, but advantageous that the studio camera move with the actor in a scene showing dimensional depth by changing interposition of scenic images. In reality, the apparent change of position of the images of motionless objects from one point of view to another is in accordance with a precise relationship.

When camera and projector follow an actor walking on a curve by rotation of the line of projection about the axis of the curve, the maximum size of picture is obtained if the projection is not outward from the axis of the curve, but diametrically inward toward and across it, as in FIG. 23. With the same projection lens, this will result in a scene twice as large as can be attained by projection at the axis. To attain a picture of the same size on the screen with the same lens at the axis and to enable the actor to continue his movement for any apparent distance, a studio area four times as large would be required.

This method has the greatest space economy because the screen 31 always occupies a position at a fixed radial distance from the axis of the curve while the projector 32 is diametrically opposite screen 31 as shown in FIG. 23, as a practical matter resulting in space duplication. Therefore, if the camera and projector are conjointly revolved more than 180° about the axis C, both projector and screen occupy the same stations on the curve but at different times.

In reality, this method of photography would result in a direction of interpositional image movement which is the opposite of a camera revolving in the same direction about an axis, but with a field of view directed outward from the axis. To show this difference, in FIG. 24, camera 65 and camera 66 each on an axis through the center C, move the same number of degrees about the center C in the same angular direction counter clockwise. Since camera 65 moves to the right relative to the line of posts, the line of sight of far objects moves to the right of the line of sight of near objects. The direction of interpositional movement of images is opposite in the field of view of camera 66, because far objects appear to the left of near objects.

The advantage of ability to adjust the position control of the changing locations of the projected images is that they need not be projected by a projector which duplicates the course of the location camera in reality, and yet can be made to produce a composite scene with an adjusted illusion of dimensional reality because such scenes are conventionally shown by a stationary projector on a stationary screen, with the audience having no means of orientation.

The important consideration in attaining an illusion of continuous motion of the observer in one direction by dimensional depth is that there be changing interposition in the final composite picture with the interpositional change in the direction which is correct for the desired illusion and with the ratio of change in proportion to the desired illusion of actor change of position. In composite photography in a studio, when a scene such as that of FIG. 23 is used containing a foreground property such as post 6 and projected images of posts 7 and 8 and it is desired to "track" an actor 37 on path 67 to produce an illusion of freedom of movement continuously in one direction, a photographic, or exact, representation of the location scene cannot attain an acceptable result. As may be seen in FIG. 23 projector 32 duplicating the course of location camera 65 of FIG. 24 will project interposed images in a direction by which the view of studio camera 33 will clearly indicate that the actor is walking in a circle.

To attain in limited space an illusion of actor movement in any direction on a straight line for an unlimited distance within a scene of dimensional depth by means of my invention, a changing series of pictures comprising contiguous sections of a scene is taken by movement of the location camera to record interpositional movement of images in the ratio and direction for the desired illusion. To do this, pictures may be taken as described in connection with FIG. 18, with the movement of the location camera on a straight line perpendicular to the line of view. When projected as a true moving picture in accordance with my invention, the changing views indicate maximum translatory movement and show maximum dimensional depth of objects when projected in positions in space located on a curve, even though taken by straight line movement of the location camera. This may be done by moving a studio projector not on a straight line but by revolving movement about an axis such as that through center C of FIG. 25 when the total area of the projected picture is given translatory movement which moves it through space approximately the same distance for each change of frame as it would be moved if the projector were on a course duplicating the straight line movement of the location camera. Then, although the course of a moving actor whose image is centered in and combined with the moving scenic image must be curved when an illusion of extended movement is attempted, the positional information supplied by the changing background views is so powerful that it will appear that the actor is moving in a straight line in one direction. While the actual linear movement of an actor in front of the screen will be less than in FIG. 20 or FIG. 21, since he walks in a circle of less circumference than the course of the scenic images, his linear movement through space can be estimated only by the appearance of change of position relative to images of other objects and will appear to be the same as in FIG. 20 or FIG. 21.

In FIG. 25, as the actor moves to the left counter clockwise on path 67, the camera moves in the same rotational direction but to the right, because they are on opposite sides of the center. The images of far posts appear on the screen in positions X and X' when the projector-camera reaches position P. This method attains maximum size of picture and apparent change of perspective in proportion to space required.

In the photography of the final composite picture, when dimensional depth is shown by changing relative positions of images to convey the feeling of translatory camera movement following the course of actor movement, the projected images of motionless objects must move in the studio to enable them to appear to be immobile. Movement of background images relative to ground in the studio is in the opposite direction to that relative to ground when the final composite picture is projected from a stationary projector. Therefore, if during the taking of the composite pictures actor 37 in FIG. 25 moves to the left relative to the studio floor, in the projection of the final composite picture, foreground scenic images in front of his image which may overlay his image, move to the right on the final screen with a change of apparent position at a faster rate than background images, and scenic objects behind his image which his image may overlay, also move to the right with a change of apparent position at a slower rate than images of foreground objects. Thus by using projected images in but two dimensions the present invention provides the optical effect of objects in three dimensions. The extent of change of interposition is comparatively unimportant. Any change provides a sense of dimensional depth, whereas when there is no change the picture remains essentially two dimensional.

FIG. 26 shows in elevation view a more flexible apparatus than that described in connection with FIG. 7 employing a single two dimensional picture with position control of images. This is not necessarily an adaptation of a changing frame or "movie" projector as it is designed to be used in combination with a conventional "still" or "slide" projector. It is constructed so that it can carry and move strip film like that described in connection with FIG. 7, a glass slide, an opaque picture or a three dimensional model. In operation, position pick-up wheel 14 rotates on ground 15 turning synchro-generator 71 which transmits power to synchro motor 72 which in turn moves slide holder 80 through variable transmission 16, pinion gear 81 and rack gear 82. Camera 83 may view the projection of a "transparent" slide on a front projection screen as in FIG. 10 or as shown in FIG. 26 may view the projection on a rear projection screen 85. As will be subsequently explained in connection with use of a matting or masking process, the camera 83 can be remote and may also view directly a projected slide, an opaque picture or a three dimensional model carried by slide holder 80.

In the employment of a matting process, the actor image and scenic image are taken by separate cameras, or the same camera separated by time, and the two images combined by well known methods of the reproductive art. These pictures may be taken by the position controlled still camera 1 of FIG. 1 which may also be a moving picture camera to photograph moving objects when moved to follow their course. When both cameras are under identical position control, then since the angular or linear aspect of the view recorded on each frame of both films is identical, a better "match" is obtained than with two cameras operating at the same constant film transport rate but at a different rate of rotary or transitory movement or both.

A greater saving of space than in a projection process is sometimes attained when my invention is used to control the relative positions of moving and changing images in a matting or masking process, as then the studio screen need only be large enough to encompass the image of the body of the actor in the view of the studio camera. The image of the scene may be of almost any size and extent relative to the image of the actor, though the actual movement of the actor is still limited by studio dimensons and by methods heretofore explained to apparently extend the dimensions of his movement apply in the manner heretofore explained.

In this process as used in television, while the scenic image is often photographed by a first camera, such as location camera 1 of FIG. 1 or FIG. 27, it is always photographed, simultaneously with the photography of the actor by a second studio camera such as camera 33 of FIG. 28, by a third camera shown as camera 86 of FIG. 28. Since the final cameras of this three-camera system are usually remote from each other, camera 86 may be termed a remote camera to contrast it with location camera 1 of FIG. 27 or studio camera 33 of FIG. 28.

The motion and position control methods of my copending application Serial No. 239,728, now Patent No. 2,822,720 and those of this invention supply advantages when combined with a matting technique.

The employment of a matting proces is sometimes difficult because the actor cannot see the scene he appears to be in, as it is taken by a remote camera and he must act before a blank screen such as the black velour screen 73 of FIG. 28. To enable the actor to move in such a situation, a space course can be laid out on the level studio floor, and easily followed because the actor need conform to only two dimensions, but when it is also necssary for him to follow a time course, the problem of a match in the matting of actor image and scenic image increases in complexity to such a degree that the scenes almost invariably used are "stills," with no more dimensions than two of space, or contain change or action which has no relation to the timing of the dramatic action of the actor. Therefore the scene usually lacks time as a dimension and as a consequence contains no dimensional depth.

FIG. 27 shows a plan view of a street, with paths of pedestrians walking on the sidewalk and of automobiles passing. It is desired to reproduce this scene in a studio so that it may be used as a setting for new "live" action to be combined with the previously recorded scene as a composite picture. This can be done by simply photographing the street on location with a conventional rate controlled "movie" camera without rotary or transitory movement, and using the film in a conventional stationary camera-projector with a front or rear studio projection process or in a three-camera matting process. This, however, limits the movement of the actor, and if it is desired that he cross the street in an interval between the apparent passage of automobiles along the street, the necessary very close time correlation between actor movement and the incidence of a particular series of frame changes is difficult.

A projector with a constant film transport rate may be used in matting with an automatic record playback of motion as explained in my above mentioned copending application Serial No. 239,728, as shown in FIG. 28 which is a plan view of a studio set designed to reproduce the street scene of FIG. 27. In this instance, only the studio camera moves under record playback control. The projector and a remote camera are motionless. In this combination, actor 37 and studio camera 33 move to follow a record of motion in synchronism with the film in motionless remote projector 87, a conventional projector with a constant film transport rate projecting a film viewed by motionless remote camera 86. In operation, the record of the movement of the location camera, in recorder 88, which may be a part of remote projector 87 when a magnetic stripe on film is used for the record, controls motor 84 through motor control 89 to move studio camera 33. This combination may provide an automatic cue so that the actor will know when he can cross the street between the apparent passage of automobiles. If the location camera moved only while the street was clear of traffic, he need only observe the studio camera, or any other studio equipment such as lights or microphones which are under control to move with studio camera 33, and begin his crossing immediately after their position begins to change to duplicate the movement of the location camera.

Figure 29:
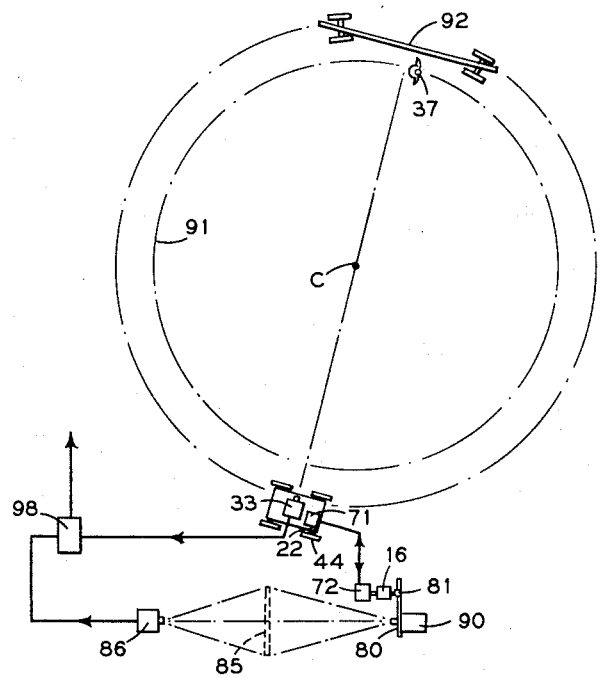
FIG. 29 shows a matting technique with the change of picture in a remote projector controlled by the movement of a studio camera.

Position control of the operation of the scenic image forming device, which may be a position controlled single picture or changing frame projector shown as projector 90 of FIG. 29, is fully as important in a masking process, sometimes called "electronic insertion" in television, as in a studio projection process, such as the projection process of FIGS. 10 and 11 where the actor's body acts as a mask to cut out sections of the background image occupied by the image of his body and the foreground screen acts as a mask to cut out the sections of actor image overlaid by foreground images. This masking by process is sometimes called in television "electronic matting" or "insetting."

With my method of spatial recording which allows flexibility of time reproduction, there may be a "built in" rate correlation which removes the problems of correlation of initial time incidence. The actor needs no cue to govern his change of position as above since the appearance of scenic images, which may appear to be either moving or motionless, is caused as a result of following his movement.

In the combination as shown in FIG. 29, actor 37 moves on path 91 in view of studio camera 33 and is backed in all positions by moving screen 92, which may be covered with black reflex-reflector material such as "Scotchlite Camoflage Black #234" to serve in either a projection or matting process as explained in my copending application Serial No. 461,195, now abandoned. As the camera 33 moves to follow the motion of the actor, motion pick-up wheel 14 and shaft 22 power the self synchronous generator-motor combination 71 and 72 which may be separated any distance from each other.

This impulse is transmitted through the variable ratio transmission 16 to gear 81 which may move the remote slide carrier rack 80. Alternatively, the same impulse may be used to move commutator 17 of FIG. 7 to change frames. As explained in connection with FIGS. 7 and 10, when the actor moves one foot with the moving studio camera following his movement, the scenic image changes responsively to his movement, by the frame change mechanism of FIGS. 7, 8 and 9 or by strip film directly driven by sprocket 19 as explained in connection with FIG. 7, or by movement of a picture, camera or model mounted on slide holder 80. In a matting process the moving or changing scenic image may be viewed directly by motionless remote camera 86 or projected by remote position controlled projector 90 on screen 85, both also motionless, for view of motionless remote camera 86. Relative courses of actor and image as well as the illusion of size and depth may be adjusted as explained in the description of FIGS. 20 to 25.

Figure 30:
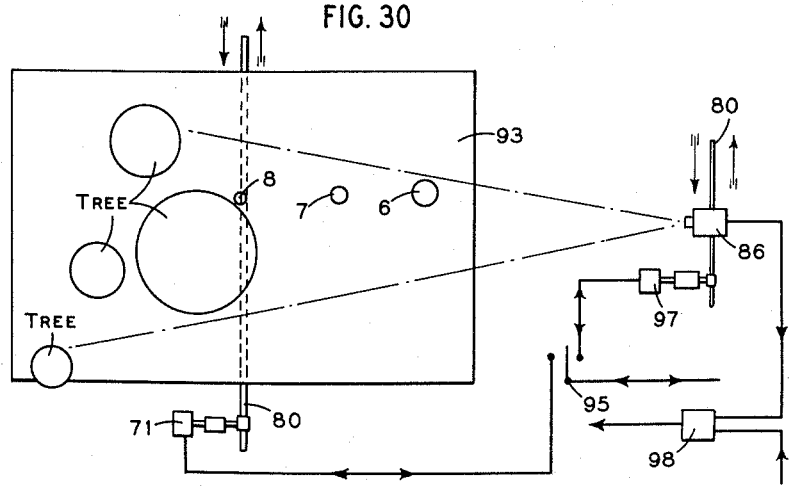
FIG. 30 shows relative movement of a remote scene or remote camera which controls the changing positions of a studio camera.

FIG. 30 shows a plan view of a three dimensional model 93 of a scene similar to that shown in elevation view in FIG. 1, with posts 6, 7 and 8 in relative size. This may be mounted on slide holder 80 and moved by transmission of a position signal from camera 33 of FIG. 29 in a manner similar to that of the two dimensional slide or film as explained in connection with FIG. 26. The difference in result is that as the three dimensional model is moved on slide carrier rack 80, a changing picture is attained in two dimensions of space and one of time as the relative positions of images change exactly as heretofore explained, and therefore while the two dimensional picture of FIG. 26 will reproduce the scene as as element of the composite picture as described in connection with FIGS. 1, 2 and 3, without an illusion of third dimensional depth except by the adjustment of one perspective plane, the model of FIG. 30 can produce the dimensional image of FIGS. 4, 5 and 6, with the same results as when the changing image is recorded and projected by a changing frame camera and projector which record and reproduce changes in the many planes of reality. While this process is in some respects simpler than the use of a location camera, studio projector and studio camera, it requires the construction of a detailed model and is more complex in other respects because two television cameras must be used simultaneously, while the location and studio cameras of the projection technique may be the same camera used at different times.

The separate images from studio camera 33 and remote camera 86 are transmitted electronically to matting amplifier 98 where they are combined into one composite picture for recording or transmission. While not necessarily the same in quality, all dimensional characteristics may be the same as in a composite picture produced as in FIG. 10 by simultaneous photography by one camera of both actor and projected image.

Remote projector 90 of FIG. 29 may be a changing frame projector with controls of film transport identical to those of FIGS. 7, 8 and 9, in which case an illusion of multiplane depth in the scene may be attained by methods explained in connection with FIGS. 20 to 25.

As may be noted in comparing FIGS. 28 and 29, in FIG. 29 the control signal is generated by the studio camera following the actor and the direction of signal is opposite to that of FIG. 28, where the actor follows the movement of the studio camera. When a conventional constant rate projector is used, the motion of the camera or projector, or the change of frames, is not responsive to actor movement, and therefore the signal is not reversible. In FIG. 29, the control signal and position of motor and generator may be reversed so that actor and studio camera follow the movement of a remote or location camera. In general it is an advantage to project the scenic image from a constant frame-change rate projector when the scene contains change or movement which will appear unreal when projected at a variable frame-change rate by a position controlled changing frame projector. To remove time limitations on movement of the actor in many cases where a film taken by a conventional location camera with a constant rate of change of frame is used, it will be advantageous to change the control from rate to position as explained heretofore in connection with FIG. 18.

In FIG. 30, the position of the synchro motor and generator is opposite from that shown in FIGS. 26 and 29, and therefore the movement of the studio camera will follow the change of position of model 93 if switch 95 is thrown to transmit the signal from synchro generator 71, or the movement of remote camera 86 when the switch 95 is thrown to transmit the position signal from generator 97. In this reversal of signal, the position pick-up wheel previously mentioned would become a drive wheel. In this combination, the actor would follow the motion of the studio camera as explained in connection with FIG. 28. The components may be arranged so that the control signal goes in either direction so that the change of point of view by a remote camera of a remote scene of any size may follow the movement of a studio camera, or vice versa. When additional power is needed, a servo system may be used instead of the simple synchros shown. In viewing a three dimensional scene, it is not necessary that the aspect of the camera be at right angles to the direction of motion, as it can face in any direction, and there can be relative motion between remote or studio camera and scene in any direction.

Camera 86 of FIG. 30 may move in a straight line as shown, and the scenic image taken by it combined by matting amplifier 98 with the picture taken by studio camera 33 of FIG. 29. Although the two cameras move relatively, with the motion of either camera controlled by the other, they can move on different courses for different distances, with spatial advantages as explained in connection with the projection process of FIGS. 22, 23 and 25. For example, remote camera 86 may "dolly back" along a street to photograph and keep ahead of a parade, while studio camera 33 of FIG. 29 moves relatively with its aspect approximately tangent to the curve of its path around a circle, photographing an actor who may thereby be made to apepar as if walking in the parade.

The combination of the scene with new "live" action is enormously simplified if the changes in the scene, instead of taking place at intervals of time, take place at intervals of space. The studio projection controlled by position of a series of images of objects which were moving in the original location scene and taken by a location camera with position control of frame change, will result in an illusion of movement of objects which duplicates the original scene in spatial relationship of both motionless and moving objects if the rotary or transistory movement of the studio projector duplicates the time pattern of the location camera. This method, however, will produce a satisfactory illusion when the time course is not duplicated, just so there is a time course which falls within broad limits.

For example, a scene is needed where the actor will appear to walk beside and then cross a busy street in an interval between the passage of automobiles. The instant of time at which he will start to cross may be unknown, but the rate and duration of his crossing can be predicted within narrow limits of time. If he walks on the sidewalk near the curb, or in the street, images of pedestrians will appear to be behind his body. One problem solved by my invention is the method of controlling images of automobiles which are in front of his body.

In recording such a scene, location camera 1 of FIG. 27, with frame change under position control, may pan at an angular rate of about 2° per second to take an automobile 99 passing along street 100 through the field of view of the camera at 20 miles per hour.

In recording such a scene reproduced by a projector with position control of change of frame, my invention has the great advantage of ability to begin the change of frame and consequent illusion of scenic change or motion at any time. At any instant actor 37 in FIG. 31 may start to cross the studio floor area marked "Street" 101. If he crosses on actor path 102 at a rate which will result in studio "position" projector-camera combination 32 and 33 keeping him centered in their field of view by moving at approximately the same rate as location camera 1 of FIG. 27, then the automobiles will appear to pass along the street at 20 miles per hour. If he moves at a rate that will result in his being tracked by the projector-camera at an angular rate of 1° per second, then the images of the automobiles will appear to pass along the street at 10 miles per hour, or if tracked at 4° per second, at 40 miles per hour, for example.

The location scenic picture may be taken so that passage of automobiles occurs at or between certain positions of the location camera, with no passage between other positions. If this is done and the film projected by either a studio projector or a remote projector used in matting under position control of frame change, the actor by his movement through space can automatically set an interval of time which will allow him to cross the street without interference between his image and those of passing automobiles. For example, as indicated in the plan view of a street in FIG. 27, location camera 1 can photograph automobiles passing from left to right or right to left as it moves from aspects 0° to 10°, and from 90° to 100°, but no passage between 10° and 80°. Automobiles may be photographed passing only to the left from 80° to 90°.

Reproduction of this scene may be accomplished as shown in FIG. 31 by studio camera-projector combination 32 and 33 or as shown in FIG. 32 by studio camera 33, remote projector 90, remote camera 86. In both FIGS. 31 and 32 the same studio screens 103 and 104 composed of black reflex-reflector material are used.

In FIG. 31 or FIG. 32, a studio situation corresponding to the plan view of location scene FIG. 27, the actor walks into the field of view of studio camera 33. When he reaches the center of the field of view of projection and reception, shown by aspect 0°, the camera and projector begin to move to keep him centered. As the position of the field changes, frames change in projector 32 so that the images of the passage of automobile 99 of FIG. 27 are projected on background screen 103 and on foreground screen 104, which is in front of the actor's body and also reflects the image of parked automobile 96 of FIG. 27 except when the image of automobile 99 overlays the image of automobile 96. Thus while the actor is behind screen 104, the image of automobile 96 overlays his image except when overlaid by the image of automobile 99, and automobile 99 appears to pass in front of him. The images on the film which correspond to aspects 30° to 80° contain no images of passing automobiles, allowing him a clear interval of space and time in which to cross the street. The images corresponding to aspects from 80° to 90°, which appear only as a consequence of the field of projection and view tracking the actor half way across the street, may appear to show an automobile passing to the left on the first half of the street behind his body. The images on the film which correspond to 90° to 100° may contain images of automobiles passing to either left or right or both, since both halves of the street are behind his body.

A composite picture using a matting process which is the same as that described above in connection with the studio projection process of FIG. 31 is attained with the apparatus of FIG. 32 when the actor moves in the same situation and through the same positions at the same rate but with studio projector 32 switched off, the position signal generated by studio camera 33 movement, and switch 105 thrown to transmit the position signal to remote position controlled changing frame projector 90 instead of studio projector 32. Switches 106 and 107 may be thrown to transmit the image from camera 33 and camera 86 for combination or transmission by matting amplifier 98. Thus the image from moving studio camera 33 is combined with the scenic image projected by stationary remote projector 90, viewed by remote stationary camera 86 as in FIG. 29. Images of automobiles may pass across the field of view of remote camera 86 as the studio camera 33 moves from 0° to 10° and from 80° to 100°. Foreground screen 104 composed of black reflex reflector screen material since it masks the actor's body again serves to give the illusion of two automobiles in front of the actor's body, while background screen 103 serves at all times to "blank" out all undesired images from the studio.

When camera and projector are mounted as in FIGS. 28, 31 or 32, the projector 32 may be of a standard motion picture type with a constant cyclic rate of frame change or pull down of film, with its movement through space controlled by automatic record playback as in my copending application Ser. No. 239,728, filed August 1, 1951, now Patent No. 2,822,720. This may be operated in synchronism with a television or motion picture camera by methods usual in the art. When a motion picture projector is used to project a scene to be re-photographed by a motion picture camera, two self synchronous motors of the servo mechanism type are always now used and will operate satisfactorily in my method of front projection. However, since the camera and projector are close to each other in position, this method of the present art is unnecessarily cumbersome and expensive. More accurate synchronism is obtained if both camera and projector are operated by a single motor. In FIGS. 31 and 32, if camera 33 and projector 32 are of the motion picture type, a single motor 108 as shown in FIG. 33 will drive the cyclic operation of both camera and projector.

In FIG. 33, motor 108 drives projector 32 by one end of shaft 109 and camera 33 by the other end. When the camera and projector are mounted at right angles, as shown in FIG. 34, and an opaque mirror 110 used, as described in my copending application Ser. No. 461,195, filed October 6, 1954, so that their axes of projection and reception lie in the same vertical plane, operation may be accomplished by such as gearing 111 to change the position and rate of the rotation of the single motor shaft, and in all cases both construction and operation are simplified.

What is claimed:

1. In a scenic projection system for projecting a background scene, a projector adapted to project a transparency formed from exposed film; a supporting surface upon which said projector is freely movable at random as to direction and rate of movement to shift the location of the projected image on a screen; and transparency shifting means operable, only in response to movement of said projector in respect to its supporting surface, to shift the transparency in the projector at a rate corresponding to the rate of movement of said projector and in a direction such that the background scene changes to correspond with the relative position of the projector.

2. In a scene projection system for projecting a background scene, a projector adapted to project a transparency formed from exposed film; a supporting surface upon which said projector is freely movable at random as to direction and rate of movement to shift the location of the projected image on a screen; and transparency shifting means operable, only in response to movement of said projector in respect to its supporting surface, to shift the transparency in the projector at a rate corresponding to the rate of movement of said projector and in a direction such that the background scene changes to correspond with the relative position of the projector; and a camera mounted for movement with said projector to photograph the image projected on said screen and any action or scene in the foreground of said screen.

3. In a scenic projection system for projecting a background scene, a projector adapted to project a transparency formed from exposed film; a supporting surface upon which said projector is freely movable at random as to direction and rate of movement to shift the location of the projected image on a screen; transparency shifting means operable, in response to movement of said projector in respect to its supporting surface, to shift the transparency in the projector at a rate corresponding to the rate of movement of said projector and in a direction such that the background scene changes to correspond with the relative position of the projector; and light intensity variation means operable, in response to movement of said projector in respect to its supporting surface to vary the light output of said projector at a rate corresponding to the rate of movement of said projector, with the light increasing as the projector moves in the direction of said screen and decreasing as the projector moves in the opposite direction.

4. In a scenic projection system for projecting a background scene, a projector adapted to project a transparency formed from exposed film; a supporting surface upon which said projector is freely movable at random as to direction and rate of movement to shift the location of the projected image on a screen; transparency shifting means operable, only in response to movement of said projector in respect to its supporting surface, to shift the transparency in the projector at a rate corresponding to the rate of movement of said projector and in a direction such that the background scene changes to correspond with the relative position of the projector; and adjustment means for the lens angular coverage operable, only in response to movement of said projector in respect to its supporting surface, to vary the lens angular coverage of said projector at a rate corresponding to the rate of movement of said projector, with the lens angle increasing as the projector moves in the direction of said screen and decreasing as the projector moves in the opposite direction.

5. In a scenic projection system for projecting a background scene, a projector adapted to project a transparency formed from exposed film; a supporting surface upon which said projector is freely movable at random as to direction and rate of movement to shift the location of the projected image on a screen; transparency shifting means operable, in response to movement of said projector in respect to its supporting surface, to shift the transparency in the projector at a rate corresponding to the rate of movement of said projector and in a direction such that the background scene changes to correspond with the relative position of the projector; light intensity variation means operable, in response to movement of said projector in respect to its supporting surface, to vary the light output of said projector at a rate corresponding to the rate of movement of said projector with the light increasing as the projector moves in the direction of said screen and decreasing as the projector moves in the opposite direction; and a camera mounted for movement with said projector to photograph the image projected on said screen and any action or scene in the foreground of said screen.

6. In a scenic projection system for projecting a background scene, a projector adapted to project a transparencey formed from exposed film; a supporting surface upon which said projector is freely movable at random as to direction and rate of movement to shift the location of the projected image on a screen; transparency shifting means operable, only in response to movement of said projector in respect to its supporting surface, to shift the transparency in the projector at a rate corresponding to the rate of movement of said projector and in a direction such that the background scene changes to correspond with the relative position of the projector; adjustment means for the lens angular coverage operable, only in response to movement of said projector in respect to its supporting surface, to vary the lens angular coverage of said projector at a rate respectively related to the rate of movement of said projector with the lens angle increasing as the projector moves in the direction of said screen and decreasing as the projector moves in the opposite direction; and a camera mounted for movement with said projector to photograph the image projected on said screen and any action or scene in the foreground of said screen.

7. In a scenic photographing and projection system, a camera; a supporting surface upon which said camera is freely movable at random as to direction and rate of movement; film strip shifting and exposure means in said camera, operable only in response to movement of said camera in respect to said supporting surface to shift the film strip frame by frame and expose each frame successively at a rate related to the rate of movement of said camera; a projector adapted to project a transparency formed from the film exposed in said camera; a supporting surface upon which said projector is freely movable at random as to direction and rate of movement to shift the location of the projected image on a screen; transparency shifting means operable, only in response to movement of said projector in respect to its supporting surface, to shift the transparency frame by frame in the projector at a rate respectively related to the rate of movement of said projector and in a direction such that the background scene changes to correspond with the relative position of the projector; and a camera mounted for movement with said projector to photograph the image projected on such screen and any action or scene in the foreground of said screen.

8. A system as claimed in cliam 7 including a variable speed driving mechanism interconnecting said support means and said transparency shifting surface.

9. In a scenic projection system for projecting a background scene, a projector adapted to project a transparency formed from exposed film; a supporting surface upon which said projector is freely movable at random as to direction and rate of movement to shift the location of the projected image on a screen; transparency shifting means operable, only in response to movement of said projector in respect to its supporting surface, to shift the transparency in the projector at a rate corresponding to the rate of movement of said projector and in a direction such that the background scene changes to correspond with the relative position of the projector; and a camera mounted for movement with said projector to photograph the image projected on said screen and any action or scene in the foreground of said screen; said screen being freely movable at random as to direction and rate of movement with said camera.

References Cited in the file of this patent
UNITED STATES PATENTS

| | | |
|---|---|---|
| 564,971 | Cline | Aug. 4, 1896 |
| 1,294,686 | McCormick | Feb. 18, 1919 |
| 1,301,538 | Brainerd | Apr. 22, 1919 |
| 1,307,846 | Brainerd | June 24, 1919 |
| 1,489,510 | Stromberg | Apr. 8, 1924 |
| 1,925,524 | Del Riccio | Sept 5, 1933 |
| 1,928,579 | Walker | Sept. 26, 1933 |
| 1,967,468 | Douglass | July 24, 1934 |
| 2,014,435 | Jackman | Sept. 17, 1935 |
| 2,068,410 | Hanke et al. | Jan. 19, 1937 |
| 2,123,529 | Goosson | July 12, 1938 |
| 2,150,543 | Ybarrondo | Mar. 14, 1939 |
| 2,204,709 | Straubel et al. | June 18, 1940 |
| 2,356,383 | Clarke | Aug. 22, 1944 |
| 2,422,354 | Holbrook | June 17, 1947 |
| 2,676,243 | Myers | Apr. 20, 1954 |

FOREIGN PATENTS

| | | |
|---|---|---|
| 102,681 | Austria | Mar. 10, 1926 |
| 151,751 | Austria | Dec. 10, 1937 |
| 730,912 | Great Britain | June 1, 1955 |